UNITED STATES PATENT OFFICE.

ANDREAS CHRISTIANSEN JENSEN, OF NIEDERRAD, GERMANY, ASSIGNOR TO VEREINIGTE CHININFABRIKEN, ZIMMER & CO., GESELLSCHAFT MIT BESCHRÄNKTER HAFTUNG, OF FRANKFORT-ON-THE-MAIN, GERMANY.

PROCESS OF OBTAINING VANILLIN DERIVATIVES.

SPECIFICATION forming part of Letters Patent No. 658,446, dated September 25, 1900.

Application filed December 29, 1897. Serial No. 664,452. (Specimens.)

*To all whom it may concern:*

Be it known that I, ANDREAS CHRISTIANSEN JENSEN, a subject of the German Emperor, and a resident of Niederrad, near Frankfort-on-the-Main, Germany, have invented certain new and useful Improvements in Processes of Producing Vanillin Derivatives, (for which Letters Patent have been obtained in Germany, No. 96,342, dated December 1, 1896;) and I do hereby declare the following to be a full, clear, and exact description of the invention, such as will enable others skilled in the art to which it appertains to make and use the same.

The invention consists in a process of producing vanillin derivatives by reacting with a para-amido-phenol-ether, such as para-phenetidin or phenacyl-para-amido-phenol, upon a vanillin-aldehyde, such as vanillin, vanillin alkyl carbonate, or phenacyl-vanillin.

I have found that when vanillin, which is the methylether of the proto-catechuic-aldehyde, or other similar vanillin aldehydes are reacted upon with para-phenetidin—that is to say, para-amido-phenol-ethyl-ether or another para-amido-phenyl-ether—either by heating a mixture of the two chemicals or by dissolving them in a suitable solvent and heating the mixed solutions, a condensation product under separation of water is obtained. In the simplest example—namely, in reacting upon vanillin with para-phenetidin—the reaction takes place in accordance with the following equation:

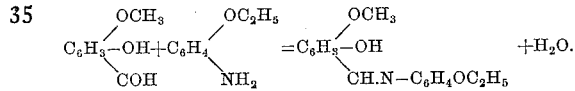

In order to obtain a pure base—that is to say, a pure condensation product—it is not advisable to bring the base or condensation product obtained by heating said substances into contact with an acid, but to simply dissolve the base in a suitable solvent and crystallize it out of its solution.

The following example will clearly indicate the mode of carrying out my invention. Ten kilos vanillin and nine kilos para-phenetidin are dissolved in twenty (20) kilos alcohol, and the latter is distilled off on a water-bath, whereby the separated water of condensation is likewise evaporated, the remaining product, which consists chiefly of the pure base, being then completely purified by dissolving it in a suitable solvent, such as benzene or petroleum ether or the like, out of which solution it can readily be crystallized. The vanillin-para-phenetidin thus obtained in accordance with the equation above given by simply heating the two substances and then dissolving the base and crystallizing it out of its solution forms yellow prismatic crystals that smell feebly of vanilla and melt at 102° centigrade. They correspond exactly to the formula given in the said equation and contain neither water of constitution nor water of crystallization.

The elementary analysis has given—

Calculated for $C_{16}H_{17}NO_3$.                     Found.
C  70.85 per cent.............................. 70.58 per cent.
H   6.27 per cent..............................  6.29 per cent.

The product is readily soluble in alcohol, but difficult of solution in petroleum ether and practically insoluble in water. Inasmuch as said product contains a free hydroxyl group, it is soluble in attenuated alkaline solutions, coloring the same yellow. By neutralizing these solutions with an acid the product is separated in the form of a yellow precipitate. The said product possesses also basic properties and forms with acid salts that are readily crystallizable. The sulfate crystallizes, for instance, in the form of fine yellow needles, the melting-point of which is from 148° to 149° centigrade. The preparation also possesses antipyretic as well as disinfecting and styptic properties, and is therefore adapted, as well as its salts, for therapeutic uses.

As hereinbefore stated, instead of vanillin other vanillin aldehydes can be used—as, for instance, vanillin-alkyl-carbonate (which before my invention was unknown, hence also a new product) or phenacyl-vanillin may be used. Instead of para-phenetidin other para-amido-phenol-ethers can be used, as above stated.

The production of these preparations with the substances last referred to is substantially the same as in the case of vanillin and para-phenetidin, equivalent quantities of the aldehyde and para-amido-phenol-ether being used and heated, either directly or in presence of a solvent, and if the base is to be obtained in a pure condition the condensation product is dissolved and crystallized out of its solution, as hereinabove set forth.

I have found that in the production of the described vanillin derivates the hitherto unknown vanillin-alkyl-carbonate, especially the ethyl-carbonate, is of great advantage, and this is obtained for the purpose as follows: 1.5 kilos vanillin are dissolved in 7.5 kilos alcohol, and to this solution is added a solution of 0.6 kilos caustic alkali in but little water. After cooling, 1.2 kilos chlor-ethylformate is allowed to flow slowly into the solution, the mixture being then heated for several hours on a water-bath and allowed to cool, after which the product formed is precipitated from the solution by means of water, removed, dissolved in a suitable solvent, such as a weak solution of spirits of wine, and crystallized out.

The vanillin-ethyl-carbonate has the following composition:

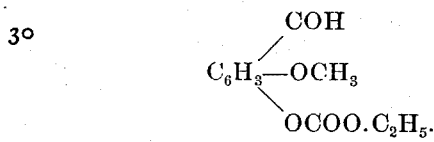

It crystallizes in the form of colorless needles that have but a feeble vanilla odor and melts at 74° to 75° centigrade. It is not readily soluble in water, but very readily in the usual solvents of substances of this character.

Inasmuch as the production of the condensation product can be effected by means of other vanillin aldehydes than vanillin and other para-amido-phenol-ethers than para-phenetidin, the following bodies can, for instance, be obtained:

Vanillin-ethyl-carbonate-p-phenetidin:

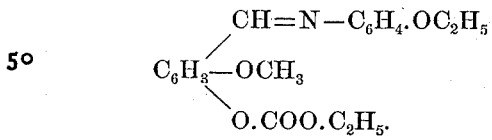

Melting-point, 87° to 88° centigrade.

Phenacyl-vanillin-p-phenetidin:

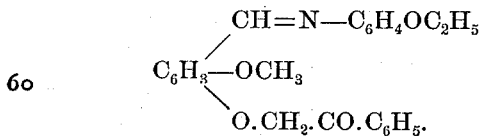

Melting-point, 91° to 92° centigrade.

Vanillin-phenacyl-p-amido-phenol:

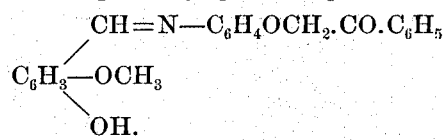

Melting-point, 69° to 70° centigrade.

Vanillin-ethyl-carbonate-phenacyl-p-amido-phenol:

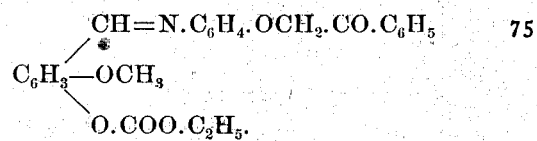

Melting-point, 107° to 108° centigrade.

Phenacyl-vanillin-phenacyl-p-amido-phenol:

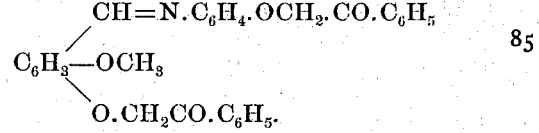

Melting-point, 114° to 115° centigrade.

All of these bodies form yellow or brownish crystals difficult of solution in water, but more or less soluble in the usual organic solvents. The last-named body is, however, difficult of solution in the said solvents. When treated with acids, all of said bodies form yellow-colored salts.

The above-mentioned vanillin-alkyl-carbonates have a general composition, according to the following formula, in which R signifies an alkyl-group:

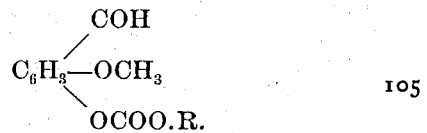

Having thus described my invention, what I claim as new therein, and desire to secure by Letters Patent, is—

Condensation products derived from vanillin aldehyde having the following properties; their melting-point varies from 69° to 115° according to the character of the product, they crystallize readily from their solutions without hydration or crystallization water, form yellow-colored salts when treated with an acid, are nearly insoluble in water and have antipyretic, disinfecting and styptic action.

In testimony that I claim the foregoing as my invention I have signed my name in presence of two subscribing witnesses.

ANDREAS CHRISTIANSEN JENSEN.

Witnesses:
WILHELM GEITEL,
THEOPHEL REZELMANN.